Nov. 21, 1961
W. H. JACKSON
3,009,467
CONVEYOR APPARATUS
Filed Jan. 26, 1959
5 Sheets-Sheet 1
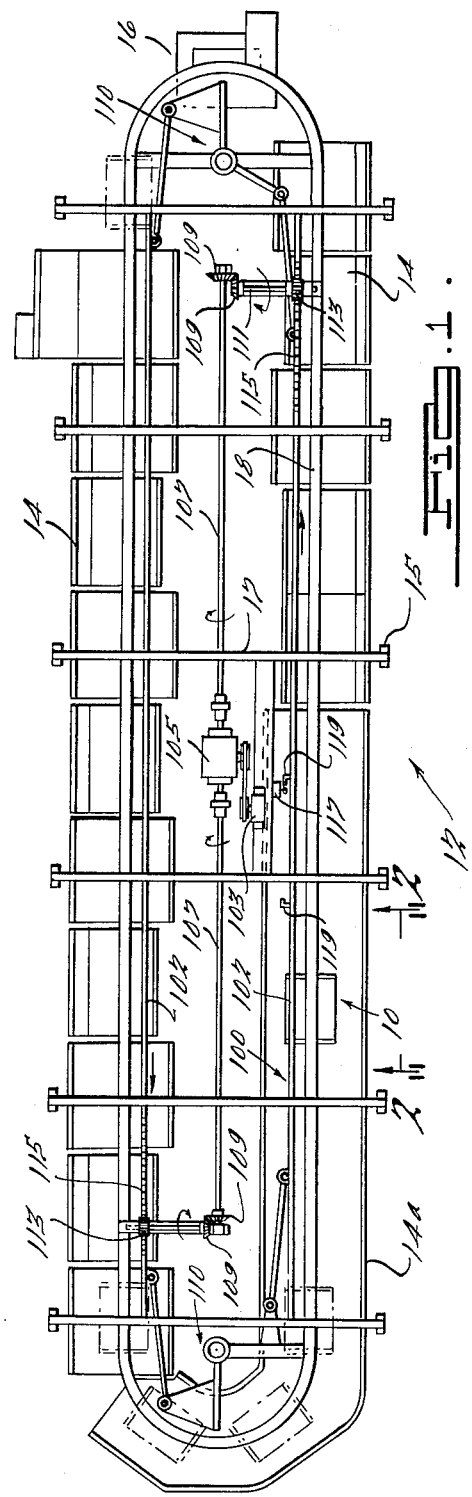
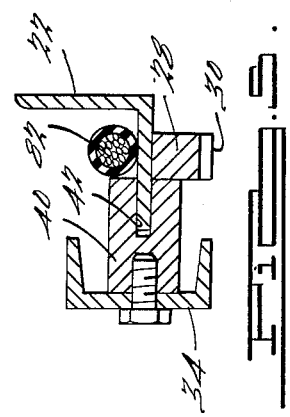
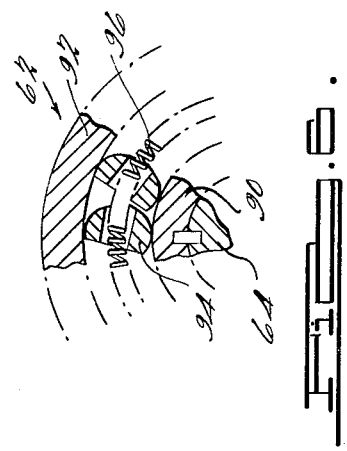
INVENTOR.
William H. Jackson
BY
Harness, Dickey & Pierce
ATTORNEYS.

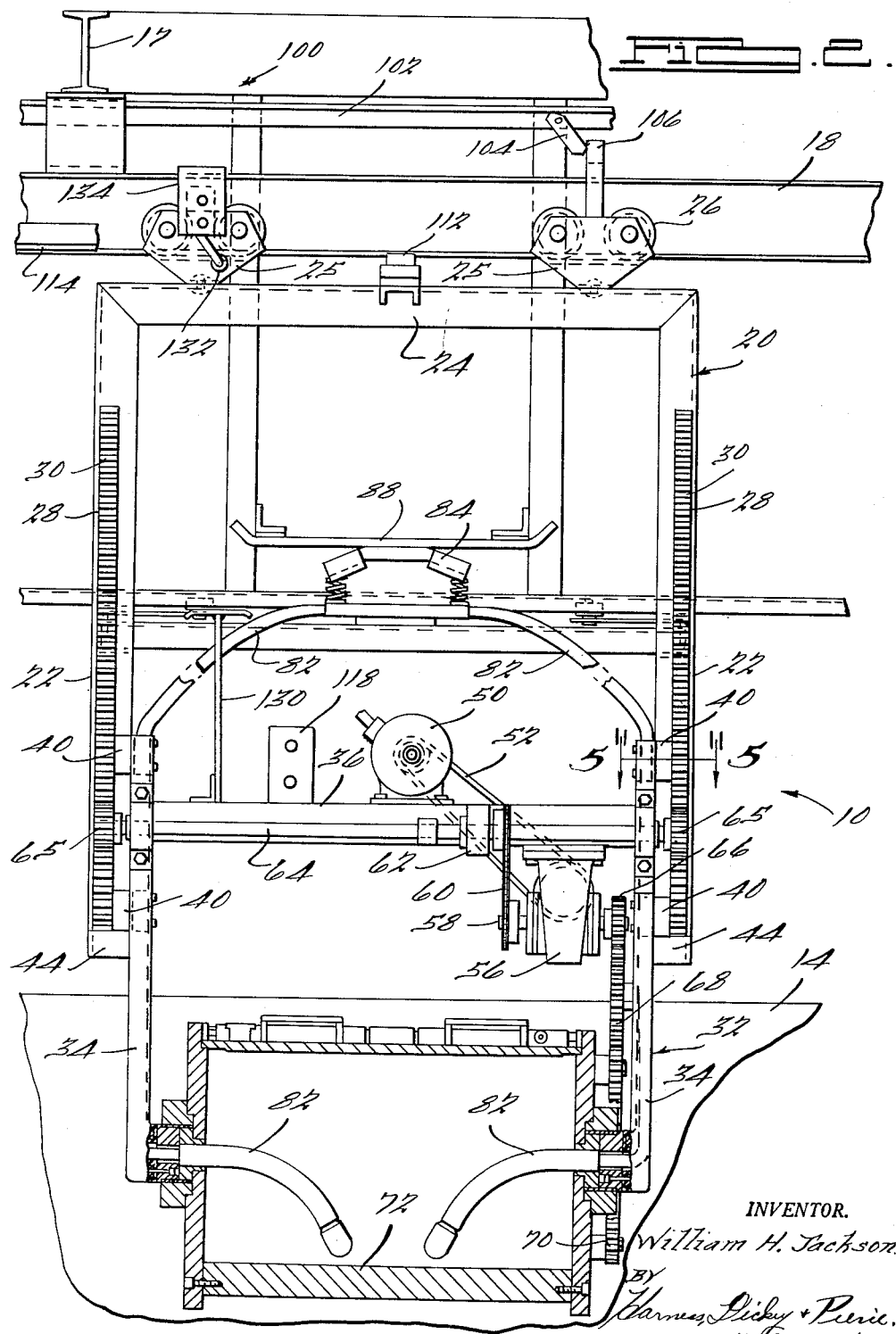

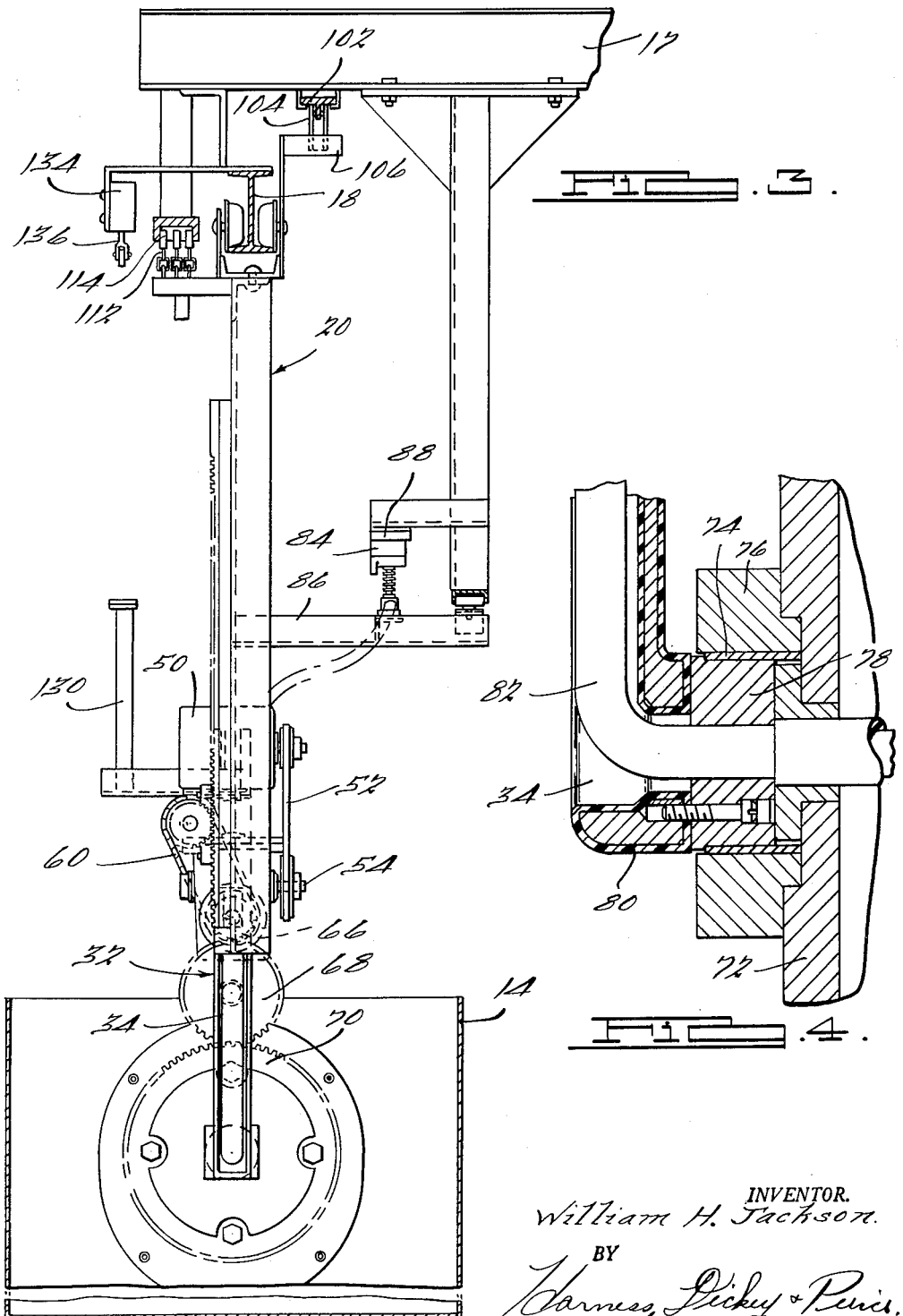

Nov. 21, 1961 W. H. JACKSON 3,009,467
CONVEYOR APPARATUS
Filed Jan. 26, 1959 5 Sheets-Sheet 4
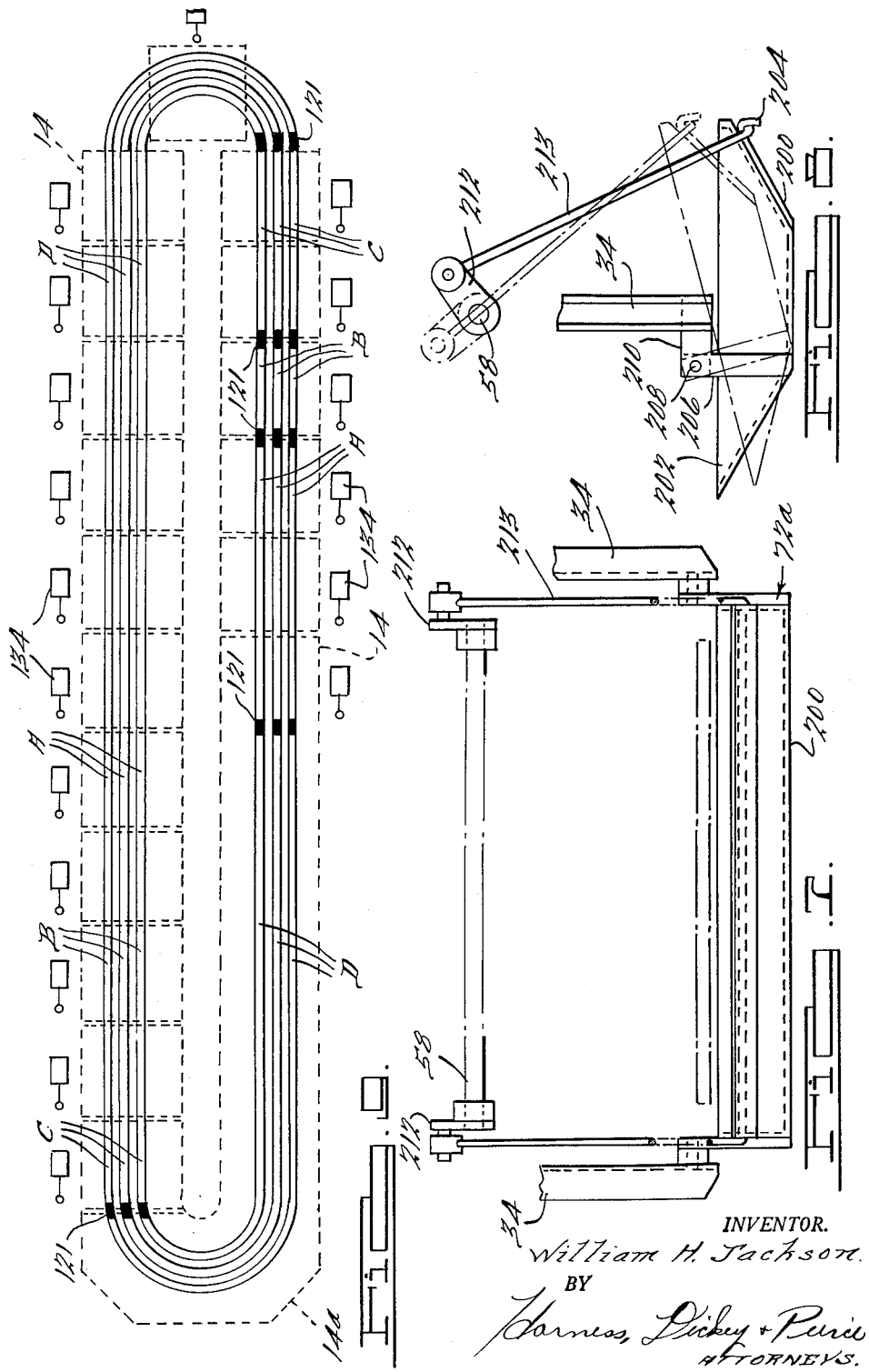
INVENTOR.
William H. Jackson
BY
Harness, Dickey & Pierce
ATTORNEYS.

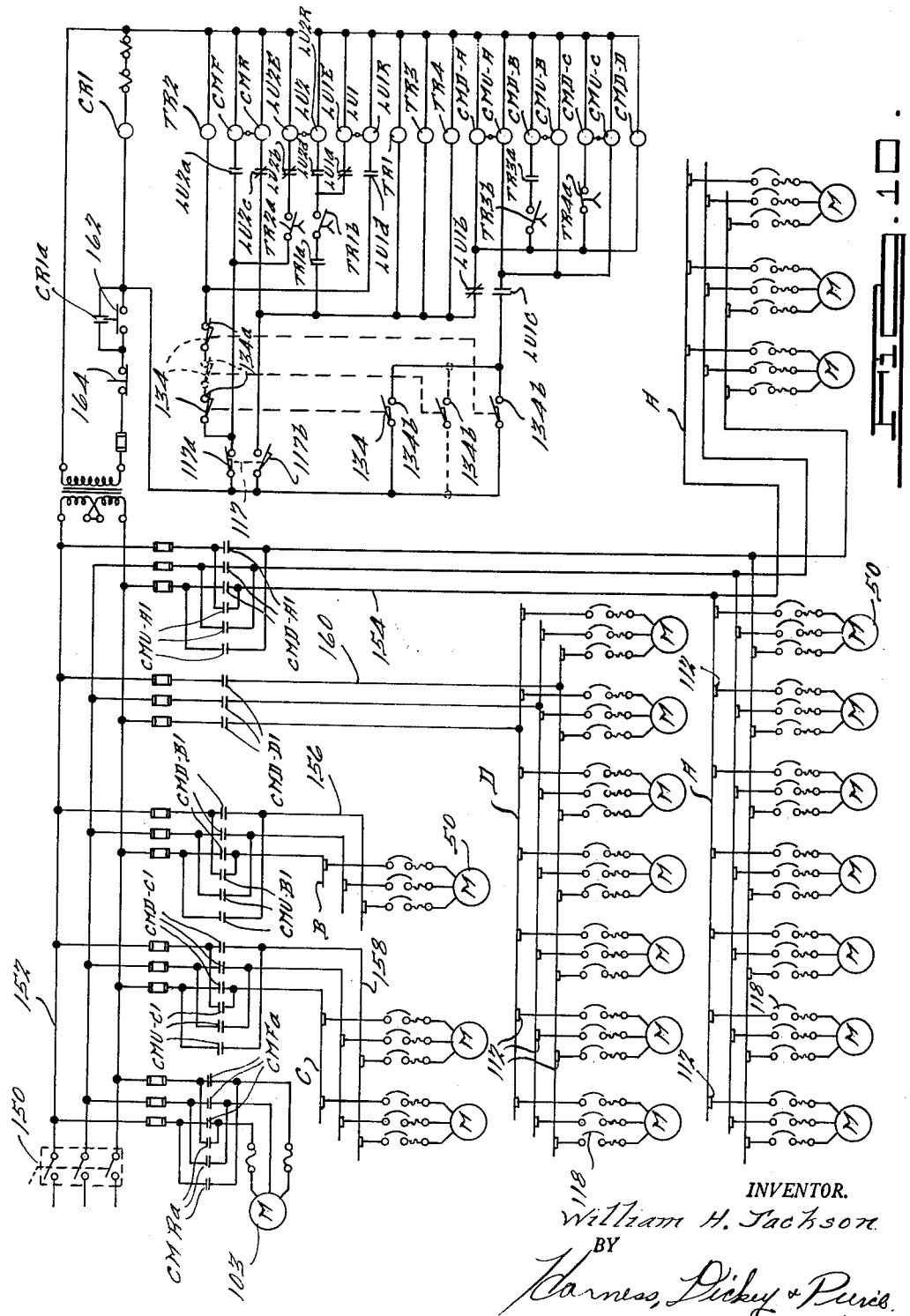

United States Patent Office 3,009,467
Patented Nov. 21, 1961

3,009,467
CONVEYOR APPARATUS
William H. Jackson, Birmingham, Mich., assignor to The Udylite Corporation, Detroit, Mich., a corporation of Delaware
Filed Jan. 26, 1959, Ser. No. 788,885
17 Claims. (Cl. 134—77)

This invention relates generally to material handling equipment and more particularly to conveyor apparatus for transporting workpieces through liquid treatment cycles.

The primary object of this invention is to provide conveyor apparatus for a machine in which the workpieces are processed or subjected to electrified or non-electrified solutions which is simple in construction and is readily adapted to different liquid treatment cycles.

A further object of this invention is to provide in a liquid treatment machine which involves up and down movement of a frame for a movable work carrier, a single motor which is operable to both raise and lower the frame and move the work carrier.

Another object of this invention is to provide in a liquid treatment machine which involves up and down movement of a frame that supports a work carrier, an overrunning clutch, speed reducer and motor assembly which is assembled with the frame so as to provide for a gravity lowering of the frame at a controlled speed.

Still another object of this invention is to provide a liquid treating machine with work conveyor apparatus which is simple in construction, economical to manufacture, and efficient in operation in moving workpieces through a desired liquid treatment cycle.

Further objects, features and advantages of this invention will become apparent from a consideration of the following description, the appended claims and the accompanying drawing in which:

FIGURE 1 is a top plan view of a liquid treating machine provided with the conveyor apparatus of this invention;

FIG. 2 is an enlarged view of a single station portion of the conveyor apparatus of this invention looking substantially along the line 2—2 in FIG. 1 and with portions broken away and portions in cross-section;

FIG. 3 is a side elevational view of the apparatus shown in FIG. 2;

FIG. 4 is a fragmentary enlarged sectional view of one end of the barrel mounting structure in the conveyor apparatus of this invention;

FIG. 5 is an enlarged horizontal sectional view looking along the line 5—5 in FIG. 2;

FIG. 6 is a sectional view of a portion of the overrunning clutch in the conveyor apparatus of this invention;

FIGS. 7 and 8 are front and side views, respectively, of a modified form of workpiece container in the conveyor apparatus of this invention;

FIG. 9 is a diagrammatic plan view of the machine of FIG. 1 showing the arrangement of the current conductors in an illustrative control system for the conveyor apparatus in the machine; and FIG. 10 is a wiring diagram of the control circuit.

With reference to the drawing, a return type liquid treating machine 12 which has a generally U-shape row of tanks 14 of various sizes and load and unload stations in the area 16 between the ends of the row is illustrated in FIG. 1. An overhead rail 18 of continuous loop shape is mounted on a main frame consisting of upright posts 15 and cross beams 17 and supports the work carriers during their travel through the machine 12.

A plurality of work-supporting assemblies, one of which is illustrated in FIG. 2 and indicated generally by the numeral 10, are supported on the overhead rail 18 for carrying the work into and out of the tanks 14 through a predetermined treatment cycle. Since all of the work-supporting assemblies 10 in the machine 12 are substantially identical, only one assembly will be described in detail.

The assembly 10 consists of an upright supporting frame 20 which is of a substantially inverted U-shape having upright parallel leg portions 22 connected at their upper ends by a horizontal base portion 24. A pair of brackets 25 are pivotally mounted on the base portion 24 and carry pairs of rollers 26 which ride on the overhead rail 18. The leg portions 22 (FIG. 5) of the frame 20 are of an angle-shape in cross section, and a vertically extending rack 28 having teeth 30 is mounted on each leg portion 22.

A hanger frame 32 is mounted on the supporting frame 20 and includes upright side members 34, each of which is of a channel shape (FIG. 5), which are connected intermediate their ends by a cross member 36. Each of the side members 34 carries a pair of guide blocks 40, each of which has an upright slot 42 into which the adjacent leg member 22 projects. This arrangement of the guide blocks 40 provides for a guided sliding support of the hanger frame 32 on the supporting frame 20 to facilitate an up and down movement of the hanger frame on the support frame. Downward movement of the hanger frame 32 is limited by engagement of the lower guide blocks 40 with stop blocks 44 secured to the lower ends of the leg portions 22 of the supporting frame 20 and projected into the path of movement of the guide blocks 40. The hanger frame 32 is illustrated in FIG. 2 in its extreme lowered position in which the lower guide blocks 40 engage the stop blocks 44.

A reversible electric motor 50 is mounted on the cross member 36 and is provided with a belt 52 which drives an input shaft 54 for a gear reduction unit 56 of the self-locking worm wheel type that is likewise mounted on the cross member 36. The gear reduction unit 56 has an output shaft 58 that is connected at one end to a sprocket chain 60 that drives an over-running clutch 62 mounted on a shaft 64 which is rotatably supported on the hanger frame 32 and is substantially parallel to the cross member 36.

The shaft 64 is provided at its ends with pinions 65 which mesh with the racks 28. As shown in FIG. 6, the over-running clutch 62, which is of a well known type and can be purchased commercially from the Formsprag Company in Detroit, Michigan, includes an inner race member 90 and a concentric outer race member 92. A plurality of sprag members 94 are positioned in the space between the inner race 90 and the outer race 92 and extend completely about the inner race 90 and at least one spring 96 extends through the sprag members 94 and about the inner race member 90. The outer race 92 is driven by the chain 60 and the inner race 90 is connected to the drive shaft 64 for the pinions 65.

On rotation of the outer race 92 in a counterclockwise direction as shown in FIG. 6, the sprags 94 are instantaneously engaged between the outer race 92 and the inner race 90 so that the inner race 90 is driven by and rotates with the outer race 92. When the outer race 92 is rotated in a clockwise direction as shown in FIG. 6, all of the sprags 94 are instantaneously released so that the inner race 90 is free to rotate relative to the outer race 92. However, the inner race 90 is free to rotate in a clockwise direction only until it forces the sprags 94 against the outer race 92 to again lock the races 90 and 92 together.

The opposite end of the output shaft 58 carries a gear 66 which meshes with an idler gear 68 supported on one of the side frame members 34. The gear 68 drives a gear 70 which is mounted on a barrel container 72 rotatably supported on the lower ends of the side frame members 34.

It can thus be seen that the reversible motor 50 is operable to drive both the clutch 62 and the container 72 for work to be treated in the machine 12. As shown in FIG. 4, the barrel 72 is provided at each end with a bearing member 74, formed of a low friction material such as Teflon and carried in a retainer ring 76 secured to the barrel 72. Each bearing 74 extends about an annular supporting block 78 that is carried by the lower end of the corresponding side frame member 34, which is provided with insulation 80 to electrically insulate the barrel 72 from the hanger frame 32. Conductors 82 extend through the bearing block 78 into the interior of the barrel 72 for providing the necessary electrical contact for the workpieces in the barrel 72 to function as cathodes. At their upper ends, the conductors 82 are connected to a shoe 84 which is resiliently mounted on a rearward extension 86 of the supporting frame 20. In work stations on the machine 12 at which a source of current for the conductors 82 is desired, a cathode bar 88 is mounted on the main frame of the machine at a position in which the shoe 84 will engage the cathode bar 88 at such a station to provide for a supply of current to the conductors 82.

A modified form of container for workpieces to be processed in the machine 12 is illustrated in FIGS. 7 and 8. The container consists of an oscillating tray 72a having a bottom wall 200, end walls 202, and a hook-shape extension 204 at its rear side. Upwardly extending straps 206 secured to the side walls 202 are mounted at their upper ends on pivots 208 carried by forwardly projecting extensions 210 provided on the lower ends of the hanger frame side members 34.

The tray 72a is driven by crank members 212 secured to opposite ends of the drive shaft 58 for the speed reducer 56. A U-shape link 213 is secured at its ends to the cranks 212 and extends downwardly under the hook-shape tray extension 204. On rotation of the cranks 212, the link 213 is alternately lifted and lowered to oscillate the tray 72a as shown in solid and broken lines in FIG. 8. The tray 72a may be substituted for the barrel 72 in processes in which a more gentle movement of the workpieces is required than can be obtained by the rotating barrel 72. An example of such a process is a bulk chromium treating process or an electro-polishing process. In both cases, the maintaining of good electrical contact between the workpieces and the container is essential and by confining the movement of the workpieces to a gentle oscillating movement, this electrical contact is maintained. The tray 72a is readily emptied at the unload station by lowering onto stationary stops which pivot the tray upwardly about the pivots 208.

In the use of the machine 12, the work-supporting assemblies 10 are suspended on the overhead rail 18 as shown in FIG. 2 and are moved between successive stations in the machine 12 by an overhead pusher or transfer mechanism 100 of well known type. The transfer mechanism 100 includes a pair of pusher bars 102 which are slidably supported on the cross beams 17 at positions inwardly of the straight portions of the work-supporting rail 18. Depending dogs 104 are pivotally supported at their upper ends on the pusher bar 102 and at their lower ends are engageable with upwardly extending pusher plates 106 carried by the work-supporting frames 20. Turnaround mechanisms 110, of the type disclosed in Davis Patent 2,591,682, or the equivalent, may be provided at the ends of the pusher bars 102 for moving work-supporting assemblies 10 along the curved end portions of the track 18.

The pusher bars 102 are driven by a motor 103 which is mounted on the machine frame and drives a speed reducer 105 which in turn drives a pair of shafts 107 that are parallel to the pusher bars 102. Meshing gears 109 on the ends of the shafts 107 and shafts 111 parallel to the beams 17 provide for a driving of pinion gears 113 which drive racks 115 secured to the pusher bars 102. A stationary limit switch 117, actuated by actuators 119 on one of the pusher bars 102, controls operation of the motor 103 to effect reciprocating movement of the pusher bars 102 to advance the assemblies 10 in a counterclockwise direction around the loop defined by the overhead rail 18.

A supply of alternating current for the motor 50 in each assembly 10 is provided by three brushes 112 carried by the work-supporting frame 20 at a position engageable with three corresponding bus bars 114 carried on the main frame of the machine. A lift limit switch 134 is disposed at each station at which the work is to be lifted out of the tank at that station and an actuator 130 on each hanger frame 32 is adapted to operate the switch 134 in the raised position of the frame 32. A manually operable "on-off" switch assembly or circuit breaker 118 is mounted on the cross member 36 in each assembly 10 and connected to the motor 50 for providing for manual control of the movement of the work-supporting barrel 72 when the assembly 10 is at the load and unload station for the machine 12. The movement of the work container 72 at the various work stations is readily controlled by interposing insulation members 121 between lengthwise sections of the bus bars 114 so as to divide the loop defined by the bus bars 114 (FIG. 9) into sections, designated by the letters A, B, C and D for convenience.

Assume that the pusher bars 102 have been fully retracted, the hanger frames 32 are in their elevated positions, all of the lift limit switches 134 have been operated so that their contacts 134a are closed and 134b are open and the mechanically held relays (which are designated by the prefix "LU") in the control circuit are in their trip positions. To initiate operation of the machine 12, a main disconnect switch 150 in a current supply line 152 is closed. As shown in FIG. 10, the supply line 152 is separately connected by lines 154, 156, 158 and 160 to the bus bar sections A, B, C and D, respectively. The switches 118 on all of the assemblies 10 which are to be used to process work in the machine 12 are closed and the start switch 162 is moved to a closed position. Closing of the switch 162 causes energizing of the control relay CR1 so that the normally open contacts CR1a are closed to lock in the start switch so that it can be released. In order to discontinue operation of the machine it is necessary to operate a manually operable stop switch 164 connected in series with start switch 162.

In response to closing of the start switch 162, drag-out timer relay TR2 is energized. Because the contacts 117a for the transfer limit switch 117 are closed an energizing solenoid LU2E for a lockup relay LU2 is energized as soon as switch TR2a times out thereby closing the normally open contacts LU2a to energize the forward transfer contactor relay CMF and close its contacts CMFa. As a result, the transfer motor 103 is operated so that it moves the pusher bars 102 in forward directions so that the work carrier assemblies 10 are advanced on the mono-rail 18. At the end of the forward strokes of the pusher bars 102, the transfer limit switch 117 is operated to open the contacts 117a and close the contacts 117b thereby deenergizing relay CMF and stopping the motor 103.

In response to closing of the contacts 117b, the down contactor relays CMD–A, CMD–C and CMD–D are energized so that the contacts CMD–A1, CMD–C1 and CMD–D1 are closed and the feed rail sections A, C and D are supplied with current to provide for operation of the motors 50 on the assemblies 10 supported on the portions of the mono-rail 18 corresponding to the feed rail sections A, C and D. When the hanger frame 32 on each assembly 10 is "up" and the motor 50 therefor is started, the outer race 92 of the over-running clutch 62 is rotated in a clockwise direction thereby permitting rotation of the inner race 90 in the same direction. The weight of the hanger frame 32 and the parts thereon moves the pinions 65 downwardly on the racks 28 to thereby rotate the shaft 64 and the inner race 90. It can be appreciated that this downward travel of the pinions 65 is at the same speed as the speed of rotation of the outer race 92 since the inner race 90 cannot rotate faster than the outer race 92 without moving the sprags 94 to locking positions.

The downward travel of each hanger frame 32 is limited by engagement of the lower guide blocks 40 with the stop blocks 44 on the supporting frame 20. Continued operation of the motor 50 provides only for a driving of the gear 70 secured to the barrel 72 so that the barrel is continuously rotated to thereby tumble the parts in the barrel.

Lowering of the hanger frames 32 causes opening of the lift limit contacts 134a and closing of contacts 134b. Of course, the assemblies which have not had their circuit breakers 118 closed will not have their motors operated so that the hanger frames on these assemblies will remain in the "up" position.

At the same time, the down dwell timer relay TR1, the delayed dip timer TR3, and the intermittent rotation timer TR4 become energized in response to closing of the contacts 117b. When the intermittent rotation timer switch TR4a times out, it opens and the relay CMD–C is deenergized thereby discontinuing the supply of current to the feed rail section C. The motors 50 which have been supplied with current from the feed rail section C then stop rotating so that the work container 72 stops rotating. When the delayed dip timer switch TR3b times out, it closes thereby completing a circuit through the closed contacts TR3a to energize the down contactor relay CMD–B and close contacts CMD–B1 thereby providing for a flow of current to the feed rail section B in a manner to provide for operation of the motor 50 connected thereto so that the hanger frame 32 corresponding to the motor 50 starts to lower. This lowering movement continues until the hanger frame is in its fully lowered position so that the work supported thereon is immersed in the tank 14 below the delayed set down feed rail section B.

When the down dwell timer switch TR1b times out it closes, so that a circuit is completed through the energizing relay LU1E for lockup relay LU1. As a result, the normally closed contacts LU1b are opened thereby deenergizing the down contactor relays CMD–A, CMD–B, CMD–C and CMD–D. At the same time, the "up" contactor relays CMU–A, CMU–B and CMU–C become energized in response to closing of the normally open contacts LU1c thereby closing contacts CMU–A1, CMU–B1 and CMU–C1 to provide for a supply of current to the feed rail sections A, B and C in a manner to provide for reverse operation of the motors 50 which are supplied with current from these feed rail sections. These motors 50 are thus rotated in a direction to provide for upward movement of the hanger frames 32 corresponding thereto so that the workpiece containers carried by these hanger frames are lifted out of the fluid in which they have been immersed.

Also, in response to timing out of the down dwell timer switch TR1b, the release solenoid LU2R for the transfer relay LU2 is energized to trip the relay LU2 thereby opening the normally open contacts LU2a and closing the normally closed contacts LU2c to provide for energizing of the reverse contactor relay CMR, having normally open contacts CMRa, to start the transfer motor 103 in a reverse direction and effect a return movement of the pusher bars 102. When the pusher bars 102 have been fully returned, one of the actuators 119 engages the switch 117 to move it to a position in which the contacts 117b are closed and the contacts 117a are open. When the hanger frames 32 have been moved to their full "up" positions, the limit switches 134 are actuated by the arms 130 to close the contacts 134a and open the contacts 134b and thereby terminate the upward travel of the hanger frames 32. The switch actuating arm 130 and the lever 132 are located so that when the motor 50 is shut off, the work-supporting barrel 72 is above the upper end of the tank 14. Since the motor 50 is shut off, the hanger frame 32 cannot move downwardly on the work-supporting frame 20 because of the self-locking characteristic of the speed reducer 56.

Opening of all the contacts 134b results in deenergizing of the "up" contactor relays CMU–A, CMU–B and CMU–C so that operation of the motors 50 is discontinued. The release solenoid LU1R for the lockup relay LU1 is also energized through the closed contacts LU1d to return the lockup relay to its trip position in response to closing of all the contacts 134a.

When all of the limit switches 134 have been actuated to close the contacts 134a, which are in series, the drag-out timer relay TR2 is energized and the machine is in condition to repeat its cycle starting with each hanger frame 32 in an elevated position. It can thus be seen that the work carriers on the portion of the rail 18 corresponding to the feed rail sections A are moved successively downwardly into and upwardly out of the tanks below the sections A. A delayed set down of the carrier above the tank corresponding to the feed rail section B is accomplished and the carriers in the tanks corresponding to the feed rail section C are intermittently rotated. Carriers entering the elongated tank designated 14a, which may be for plating, remain in the tank until they reach the end of the tank and again come under control of the feed rail section A.

From the above description, it is seen that this invention provides conveyor apparatus which includes a work-supporting assembly 10 that is simple to construct and operate and which is extremely flexible in its operation since substantially the entire movement of the work-supporting barrel 72 is under the control of the single motor 50 which is utilized both for rotation of the barrel and for up and down movement of the barrel into and out of the liquid in the tank. The over-running clutch 62 shown in FIG. 6 is merely illustrative of one particular clutch that can be used in the conveyor apparatus 10 since any equivalent over-running clutch can be substituted therefor.

It is to be understood that the work carrier on the lower end of the hanger frame 32 may be of the stationary non-rotatable type, in which case the speed reducer 56 may be omitted. While it is expeditious to provide in a single machine the apparatus for providing for rotation of the work carrier so that each work assembly 10 can be usable for both stationary and rotatable work carrier apparatus, an assembly 10 with a non-movable work carrier such as a hook or bar is within the scope of this invention. The self-locking characteristic of the speed reducer 56 provides for a locking of the hanger frame 32 in its "up" position until the motor 50 is operated, so that if the speed reducer 56 is omitted or the self-locking feature is omitted other structure must be substituted to perform this function.

In its broadest aspect, of course, the invention contemplates a work-supporting assembly 10 consisting of a supporting frame 20 which is suspended from the overhead rail 18 and a hanger frame 32 which carries the work container 72 and is movable up and down on the frame 20 by means carried by the assembly 10. In the preferred embodiment of the invention illustrated this means is the single motor 50. However, the invention can be utilized in its broadest form to take advantage of the flexibility which this structure gives the machine, and utilize a separate drive for rotating the container 72 and a separate lifting means for the hanger frame 32. This lifting means could be either on the hanger frame 32 or the supporting frame 20, and in the latter case could take the form of one or more vertically movable endless chains mounted on the frame 20 and driven by a motor on the frame 20. In such case, the chains are either secured to the frame 32 or carry fingers or projections which are movable into lifting engagement with the frame 32. The chains can also be utilized for connecting the hanger frame to the supporting frame and for supporting it thereon.

Although the invention has been described with respect to a preferred embodiment thereof, it is to be understood that it is not to be so limited, since changes can be made therein which are within the scope of the invention as defined by the appended claims.

What is claimed is:

1. In a work-handling machine the combination comprising an overhead rail, a plurality of work-supporting assemblies movably mounted on said rail and intermittently advanced therealong, each of said work-supporting assemblies comprising an upright first frame, a second work-supporting frame guidably supported on said first frame for up and down movement thereon, motor means mounted on said second frame, a drive shaft mounted on said second frame and operable on rotation in one direction to move said second frame upwardly on said first frame, a speed reducer mounted on said second frame and drivingly connected to said motor, an over-running clutch mounted on said drive shaft and drivingly connected to said speed reducer and driven thereby in said one direction to rotate said drive shaft, a container for work movably mounted on the lower end of said second frame, and means connected to and extending between said speed reducer and said container for rotating said container about an axis substantially parallel to said drive shaft on operation of said speed reducer.

2. In a liquid treating machine which includes a row of tanks and rail means disposed above said row, a plurality of work-supporting assemblies movably mounted on said rail means, transfer means on said machine for moving said assemblies on said rail means, each of said assemblies including a frame mounted for up and down movement relative to said tanks for moving work thereon into and out of the liquid in said tanks and motor means on said assembly for moving said frame, conductor means disposed adjacent said rail means for supplying current to said motors, means electrically connecting each motor to a conductor section in each moved position of each assembly, means insulating longitudinally spaced sections of said conductor means from each other, and control circuit means separately connected to said conductor sections for thereby separately supplying current to ones of said motors on work-supporting assemblies supported on portions of said rail means above spaced ones of said tanks for separately controlling the movement of different ones of said frames.

3. In a liquid treating machine which includes a row of tanks and vertically fixed rail means disposed above said row, a plurality of work-supporting assemblies movably mounted on said rail means, transfer means on said machine for moving said assemblies on said rail means, each of said assemblies including a frame, a container for work rotatably mounted on the lower end of the frame, means mounting said frame for up and down movement relative to said tanks for moving work thereon into and out of the liquid in said tanks, motor means on said assembly both for moving said frame up and down and for rotating said container on said frame about a substantially horizontal axis, and conductor means disposed along said rail means for separately supplying current to ones of said motors on work-supporting assemblies supported on portions of said rail means above spaced ones of said tanks for separately controlling the movement of said frames and the movement of said containers on said frames.

4. In a liquid treating machine which includes a plurality of tanks arranged in a longitudinally extending row, conveyor apparatus for moving parts to be treated through successive ones of said tanks, said apparatus comprising vertically fixed track means above said tanks, a supporting frame movably mounted on said track means and extending downwardly therefrom to a position above said tanks, parallel spaced racks on said supporting frame, an upright hanger frame having work-supporting means rotatably mounted at the lower end thereof, pinion gears rotatably mounted on said hanger frame and disposed in meshing engagement with said racks, reversible motor means mounted on said hanger frame for rotating said pinions and said work-supporting means, an over-running clutch mounted on said hanger frame and connected to said motor means for driving thereby, said over-running clutch being connected to said pinions so that on driving of the clutch in one direction said pinions are driven in a direction to move said hanger frame upwardly on said supporting frame to a position in which said work-supporting means is above said tanks and on driving of the clutch in an opposite direction said pinions are gravity movable in a direction downwardly on said racks to lower said work-supporting means into a tank, and engageable stop means on said frames for limiting the downward movement of said hanger frame.

5. In a liquid treating machine which includes a plurality of tanks arranged in a longitudinally extending row, conveyor apparatus for moving parts to be treated through successive ones of said tanks, said apparatus comprising rail means above said tanks, a supporting frame movably mounted on said track means and extending downwardly therefrom to a position above said tanks, parallel spaced racks on said supporting frame, an upright hanger frame having work-supporting means at the lower end thereof, pinion gears rotatably mounted on said hanger frame and disposed in meshing engagement with said racks, reversible motor means mounted on said hanger frame for rotating said pinions, an over-running clutch mounted on said hanger frame and connected to said motor means for driving thereby, said over-running clutch being connected to said pinions so that on driving of the clutch in one direction said pinions are driven in a direction to move said hanger frame upwardly on said supporting frame to a position in which said work-supporting means is above said tanks and on driving of the clutch in an opposite direction said pinions are released for travel downwardly on said racks to lower said work-supporting means into a tank, engageable stop means on said frames for limiting the downward movement of said hanger frame, switch means operable to shut off said motor means mounted on said supporting frame, and switch actuating means mounted on said hanger frame so as to engage said switch means when said work-supporting means has been moved to a position above a tank.

6. A work-supporting assembly in a liquid treating machine comprising a first frame, a second frame guidably mounted for up and down movement on said first frame, said second frame having work-supporting means rotatably mounted on said second frame, rack means on said first frame, pinion means on said second frame, a drive shaft for said pinion means, a reversible motor on said second frame gear means mounted on said second frame and connected to said work-supporting means, said gear means being arranged in a driven relation with said motor to rotate said work-supporting means about an axis substantially parallel to said drive shaft, an over-running clutch mounted on the drive shaft for said pinion means and arranged in a driven relation with said motor, said over-running clutch providing for rotation of said pinion means in a direction to provide for upward travel thereof on said racks in response to rotation of said motor in one direction and for release of said drive shaft to provide for downward gravity actuated movement of said pinion means on rotation of said motor in an opposite direction, and engageable stop means on said first and second frames limiting downward movement of the second frame on the first frame.

7. A work-supporting assembly in a liquid treating machine comprising a first upright frame, a second frame guidably mounted for up and down movement on said first frame, said second frame having work-supporting means rotatably mounted on the lower end thereof, a reversible motor mounted on said second frame, a drive shaft on said second frame, means drivingly connecting said motor to said work-supporting means causing rotation thereof when said motor is operated, coacting means on said drive shaft and said first frame providing for upward travel of said second frame on said first frame in response to rotation of said drive shaft in one direction, an over-running clutch mounted on said drive shaft and arranged in a driven relation with said motor, said over-running clutch providing for rotation of said drive shaft in one direction when said motor is driven in one direction and in an opposite direction in response to the action of gravity on said second frame when said motor is driven in an opposite direction, and engageable stop means on said first and second frames limiting downward movement of the second frame on the first frame.

8. A work-supporting assembly in a liquid treating machine comprising a first upright frame, a second frame guidably mounted for up and down movement on said first frame, said second frame having work-supporting means rotatably mounted on the lower end thereof, a reversible motor mounted on said second frame, means drivingly connecting said motor to said work-supporting means causing rotation thereof when said motor is operated, a drive shaft on said second frame, coacting means on said drive shaft and said first frame providing for upward travel of said second frame on said first frame in response to rotation of said drive shaft in one direction, an over-running clutch mounted on said drive shaft, a speed reducer connected to said clutch and arranged in a driven relation with said motor, said over-running clutch providing for rotation of said drive shaft in one direction when said motor is driven in one direction and in an opposite direction in response to the action of gravity on said second frame when said motor is driven in an opposite direction, and engageable stop means on said first and second frames limiting downward movement of the second frame on the first frame.

9. In a work-handling machine the combination comprising an overhead rail, a plurality of work-supporting assemblies movably mounted on said rail and intermittently advanced therealong, each of said work-supporting assemblies comprising a first upright frame, a second frame guidably mounted for up and down movement on said first frame, said second frame having work-supporting means rotatably mounted on the lower end thereof, a reversible motor mounted on said second frame, a drive shaft on said second frame, coacting means on said drive shaft and said first frame providing for upward travel of said second frame on said first frame in response to rotation of said drive shaft in one direction, an over-running clutch mounted on said drive shaft and arranged in a driven relation with said motor, said over-running clutch providing for rotation of said drive shaft in one direction when said motor is driven in one direction and in an opposite direction in response to the action of gravity on said second frame when said motor is driven in an opposite direction, means connecting said motor and said work-supporting means to provide for rotation thereof about an axis substantially parallel to said drive shaft on operation of said motor, and engageable stop means on said first and second frames limiting downward movement of the second frame on the first frame.

10. In a material handling machine which includes spaced work stations, a vertically fixed rail means extending over said work stations a plurality of work-supporting assemblies movably mounted on said rail means for sequential movement to said stations, each of said assemblies including a frame mounted for up and down movement, a workpiece container rotatably mounted on said frame; motor means on said assembly for moving said frame, up and down and for rotating said container and conductor rail means for separately supplying current to ones of said motor means on said work-supporting assemblies supported on portions of said rail means above spaced ones of said work stations for separately controlling the movement of said frames.

11. In a work-handling machine which includes a vertically fixed overhead rail, a work-supporting assembly comprising a supporting frame movably mounted on said rail for travel thereon, a hanger frame mounted on said supporting frame for up and down movement relative thereto a workpiece container rotatably mounted on said hanger frame, and coacting means on said frames operable to provide for up and down movement of said hanger frame relative to said supporting frame and means for rotating said container.

12. A work supporting assembly comprising a supporting frame having a plurality of depending leg portions, a vertically movable hanger frame having leg portions disposed adjacent said depending leg portions, a workpiece container rotatably mounted between said leg portions of said hanger frame, and coacting means on said hanger frame leg portions and said supporting frame leg portions movably connecting said supporting and said hanger frames effective to produce vertical movement of said hanger frame relative to said supporting frame and for rotating said container.

13. In work treating apparatus having a plurality of work treating locations and a vertically fixed rail spanning said locations, a work-supporting assembly comprising a supporting frame movably mounted on said rail for travel thereon, said frame including a pair of spaced downwardly extending portions, a hanger frame mounted on said supporting frame portions for up and down movement relative thereto, a workpiece container rotatably mounted on said hanger frame, and coacting means on said frames operable to provide for up and down movement of said hanger frame relative to said supporting frame and for rotation of said container.

14. In a work-treating apparatus having a plurality of work-treating locations and a vertically fixed overhead rail disposed above said locations, a work-supporting assembly comprising a supporting frame movably mounted on said rail for travel thereon, said frame including a pair of spaced downwardly extending portions, a hanger frame mounted on said supporting frame portions for up and down movement relative thereto, work container means movably mounted on the lower end of said hanger frame, and coacting means on said frames operable to provide both for up and down movement of said hanger frame relative to said supporting frame and for movement of said container means relative to said hanger frame.

15. In a work-treating apparatus having a plurality of work-treating locations and a vertically fixed overhead rail disposed above said locations, a work-supporting assembly comprising a supporting frame movably mounted on said rail for travel thereon, said frame including a pair of spaced downwardly extending portions, a hanger frame mounted on said supporting frame portions for up and down movement relative thereto, work container means movably mounted on the lower end of said hanger frame, and means on said supporting frame releasably connecting said hanger frame to said supporting frame for vertically moving said hanger frame relative to said supporting frame and for movement of said container means.

16. In a work-treating apparatus having a plurality of work-treating locations and a vertically fixed overhead rail disposed above said locations, a work-supporting assembly comprising a supporting frame movably mounted on said rail for travel thereon, said frame including a pair of spaced downwardly extending portions, a hanger frame mounted on said supporting frame portions for up and down movement relative thereto, work container means movably mounted on the lower end of said hanger frame, and means on said hanger frame releasably connecting said hanger frame to said supporting frame and for moving said hanger frame up and down relative to said supporting frame and for moving said work container means.

17. A conveying machine for successively transferring workpieces through a series of treating stations comprising a supporting rail extending above the treating stations, a plurality of work-supporting assemblies movably mounted on said rail, means for advancing said assemblies along said rail, each of said assemblies comprising a first frame movably mounted on said rail, a second frame guidably mounted for up and down movement on said first frame between a raised position and a lowered position, a workpiece container rotatably mounted on the lower portion of said second frame, a reversible motor on said second frame, gear means drivingly connecting said motor to said container causing rotation thereof when said motor is operated, rack means on said first frame, pinion means affixed to a drive shaft rotatably mounted on said second frame and coacting with said rack means, coupling means on said drive shaft drivingly connected to said motor, said coupling means operable in response to rotation of said motor in one direction to release said drive shaft enabling downward controlled gravity movement of said second frame and continued operation of said motor after said second frame attains said lowered position, and operable in response to rotation of said motor in the opposite direction to engage said drive shaft raising said second frame to said raised position, switch means deactivating said motor when said second frame attains said raised position, and stop means associated with said first and said second frames limiting the downward travel of said second frame.

References Cited in the file of this patent
UNITED STATES PATENTS

| | | |
|---|---|---|
| 482,706 | Walter | Sept. 13, 1892 |
| 571,864 | Parkhurst | Nov. 24, 1896 |
| 956,327 | Epstein | May 24, 1910 |
| 1,634,854 | Scollard | July 5, 1927 |
| 2,337,586 | Bowen | Dec. 28, 1943 |
| 2,851,944 | Davis | Sept. 9, 1958 |